June 11, 1946. H. W. CRAM 2,401,912

WIRE THREAD BUSHING

Filed April 28, 1945

INVENTOR
HARKNESS W. CRAM
BY *Walter S. Heston*

ATTORNEY

Patented June 11, 1946

2,401,912

UNITED STATES PATENT OFFICE 2,401,912

WIRE THREAD BUSHING

Harkness W. Cram, Pelham, N. Y., assignor to Aircraft Screw Products Company, Inc., Long Island City, N. Y., a corporation of New York Application April 28, 1945, Serial No. 590,773

3 Claims. (Cl. 85—32)

The present invention relates to wire thread bushings of a kind frequently used in screw connections. Such bushings are conventionally coiled of a wire the cross-section of which has, in the finished bushing, an outer portion fitting the thread grooves of interiorly threaded members into which the bushing is to be inserted, and an inner portion according to the shape of the thread groove of an exteriorly threaded bolt or stud which the bushing is intended to receive. The bushing are destined to stay in the interiorly threaded members even if the bolts or studs are to be screwed in and out repeatedly. However, it is frequently found that a bushing rather than to remain in place, clings to the exteriorly threaded member and follows it when the member is screwed out. If this happens the interiorly threaded member instead of being protected against wear is easily damaged.

The invention aims to avoid this drawback and one of its objects is to provide a method whereby a wire thread bushing may be produced which has the tendency to adhere more strongly to the interiorly threaded member than to a bolt screwed into it. It chiefly consists in that the outer surface of the bushing which is intended to engage the interiorly threaded member is impacted by a hard, granulated material, e. g. sand-blasted or shot-peened, while the inner smooth surfaces are protected from the attack of such material. The invention also consists in a wire thread bushing the outer surfaces of which are sand-blasted whereas the inner surfaces are smooth.

Further objects and details of the invention will be apparent from the description hereinafter and the accompanying drawing showing by way of example an embodiment of the invention and illustrating the method applied in producing it.

Figure 1:
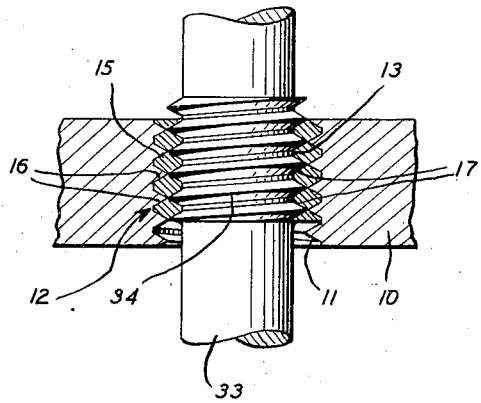
Fig. 1 is a cross-section of a boss portion provided with a bushing according to the invention, and with a bolt member engaging the bushing.
Figure 2:
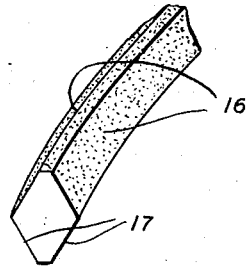
Fig. 2 is a front elevation of a portion of a convolution of the bushing of Fig. 1.

Referring now to the drawing, Fig. 1 shows a portion of a boss member 10 provided with an inner threading 11 of V-shaped groove cross-section. The threading 11 is engaged by a wire thread bushing 12 coiled of a wire having substantially diamond-shaped cross-section. Into the interior of the bushing 12 a bolt 33 is screwed which has an external threading 34 fitting the threading formed by the inner cross-sectional portions 13 of the bushing. It will be clear that if the bolt threading 34 has a tight fit it will urge the convolutions of the bushing with its outer cross-sectional portions 15 wedgingly into the thread groove 11 of the boss member so that a very reliable screw connection is formed. In general the bolt may be screwed in and out of the bushing seated in the boss member, particularly if the bushing is coiled oversized so that there is a tendency of its springing into the thread groove 11. However, it happens with conventional bushings of such kind that the friction between the threading 34 of a bolt and the bushing portions 13 becomes greater than the friction set up between the bushing and the threading 11 of the boss member 10. In such an event the bushing would cling to the bolt and if the latter is screwed out the bushing would follow the bolt and screw out of the groove 11 thereby injuring or wearing out the flanks of the boss groove, an occurrence which is exactly contrary to the purpose of the application of the bushing. It has been tried to prevent such happening by serrating the outer surfaces 16 of the bushing. However, such serrating easily interferes with the insertion of the bushing and furthermore, it may happen that such serrations act in a manner of a milling cutter on the flanks of the groove 11 with the result that the threading of the boss as well as that formed by the inner portions of the elastic bushing do not furnish such fit as may be desired for the screw connection if the bolt is screwed in. Another known method to prevent a wire coil bushing from backing out consists in that the end convolution is provided with teeth forced into the boss material after the insertion of the bushing, however such method requires additional steps of operation and may even not be applicable in each instance. According now, to the invention the outer surfaces 16 of the wire coil bushing are slightly roughened, preferably sand-blasted whereas the inner surfaces 17 are smooth. If this is done the outer surfaces will cause higher friction between the bushing and the boss into which it is inserted than the friction occurring between the bushing and an inserted bolt. Further, in view of the fact that in order to insert the bushing into the boss member the coil will be slightly contracted in most cases, there is no danger that the very slight roughening produced by sand-blasting will injure the thread flanks of the boss member, even if the latter consists of a relatively soft material such as aluminum or an aluminum alloy.

Figure 3:
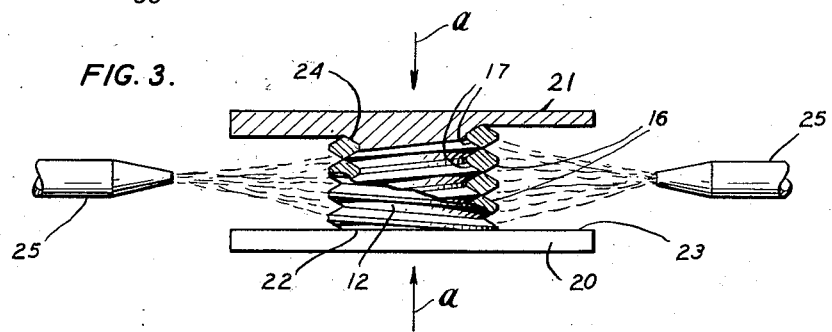
Fig. 3 is a diagrammatical illustration of an arrangement partly in section for the application of the method according to the invention.

Now, in order to provide a wire thread bushing with sand-blasted or similarly treated outer surfaces, it is necessary to take care that during the sand-blasting operation the sand cannot attack the inner bushing portions which are intended to remain smooth. In particular, steps should be taken to prevent the impacting material from entering through gaps between adjacent coil-convolutions. This can be accomplished by so compressing the coil in its axial direction that the adjacent convolutions firmly contact each other while the sand is propelled against the outer surfaces. For this purpose, the bushing 12 formed by coiling the wire may be placed, according to the illustration of Fig. 3, between end plates 20 and 21 pressed together in axial direction, as indicated by arrows a. If the bushing has a flat end surface as the lower coil end 22 of Fig. 3, the engaging plate may have a plane top surface 23 too. If, however, the end surface of the coil is helical according to the pitch of the coil, then it is advisable to form a helical seat for the bushing as shown in the upper portion of Fig. 3 where plate 21 is provided with a helical projection 24 engaging the upper helical end of the coil 12. In this manner the coil 12 will be axially compressed so that adjacent coil convolutions tightly engage each other whereby the sand, blasted through nozzles 25 against the outer bushing surfaces 16 is prevented from affecting the inner coil surfaces 17 which remain smooth. In addition, plates 20 and 21 form closures for the ends of the bushing, to prevent sand from entering in a more or less axial direction. It is to be noted, however, that the axial compression of the coil can be perfected by any other suitable means. Closing of the coil ends is not absolutely necessary in many instances, since, owing to the more or less radial direction of the blast, sand entering from the ends will not forcibly impinge on the inner coil surface. The illustrated closure plates are preferred because their proper application renders a subsequent cleaning of the coil interior from sand unnecessary. In order to obtain an evenly treated outer surface throughout the entire coil there may be either a larger number of blasting nozzles 25 arranged on a circle about the bushing, or the bushing 12 together with the plates 20 and 21, may be rotated about the bushing axis.

Figure 4:
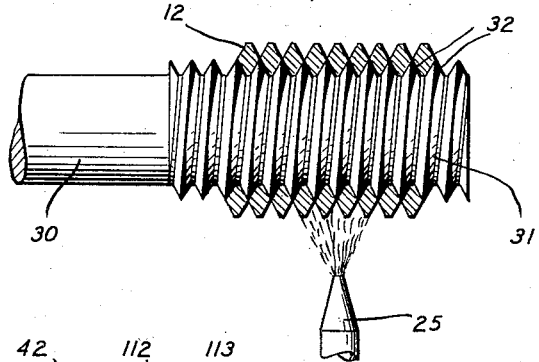
Fig. 4 is a diagrammatical illustration of another arrangement for the same purpose.

Fig. 4 illustrates another method of protecting the inside of a bushing during the sand-blasting or similar operation. In this event a mandrel 30, preferably a rotatable one, is provided with an outer threading 31 of its free end. The threading 31 is selected according to the inner threading formed by the bushing 12 which for the sand-blasting operation is screwed on the mandrel in the position shown. If now, the mandrel is rotated while sand from the nozzles 25 is blasted against the outside of the bushing 12, the flanks 32 of the mandrel threading will protect the inner surfaces of the bushing from the attack of the sand.

Figure 5:
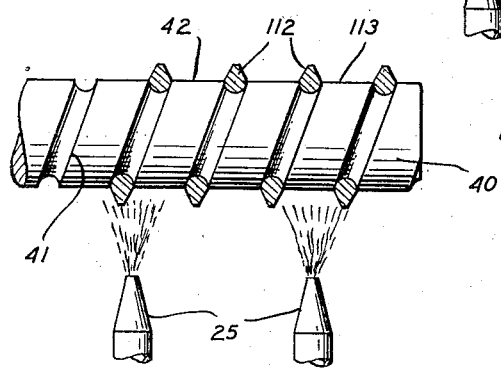
Fig. 5 illustrates a modification of the arrangement of Fig. 4.

The modification of Fig. 5 differs from Fig. 4 in that the bushing 112 is wound with gaps 113 between the individual convolutions. Accordingly, the threading 41 of the mandrel end 40 leaves lands 42 intermediate adjacent convolutions. It will be obvious that in such an event the inner surfaces of the bushing 112 are as well protected against the sand as in the case of Fig. 4. In order to show that the method is applicable to wire cross-sections other than diamond-shaped, the wire of the bushing 112 is shown as pear-shaped and the mandrel thread groove 41 is accordingly rounded as it is necessary that the mandrel groove end fits the inner cross-section of the bushing.

Although I have described sand-blasting as the preferred method of treating the outer coil surfaces, similar results may be obtained by using other hard granulated material, as e. g. in a shot-peening operation. It will be also clear to those skilled in the art that other means to protect the interior surfaces of a coiled bushing may be applied during the roughening operation without departure from the essence and spirit of the present invention, which shall be limited only by the scope of the appended claims.

I claim:

1. A coiled wire thread bushing for a screw connection, the wire of which said bushing is coiled being of a cross-section having an outer substantially V-shaped portion according to the shape of a thread groove of an internally threaded member for which the bushing is destined, and having an inner portion of a cross-section according to the shape of the thread groove of an externally threaded member which said bushing is intended to receive, the surfaces of the outer wire portion being roughened by impact treatment and the surfaces of the inner wire portion being smooth.

2. A bushing according to claim 1 wherein the surfaces of the outer wire portion are sand-blasted.

3. A bushing according to claim 1 wherein the surfaces of the outer wire portion are shot-peened.

HARKNESS W. CRAM.